(12) United States Patent
Chen

(10) Patent No.: US 11,149,826 B1
(45) Date of Patent: Oct. 19, 2021

(54) PLANETARY ROLLING MICRO-JACKING DEVICE

(71) Applicant: Zibo Votaisi Petrochemical Equipment Co., Ltd, Zibo (CN)

(72) Inventor: Jimeng Chen, Zibo (CN)

(73) Assignee: Zibo Votaisi Petrochemical Equipment Co., Ltd, Shandong (CN)

( * ) Notice: Subject to any disclaimer, the term of this patent is extended or adjusted under 35 U.S.C. 154(b) by 94 days.

(21) Appl. No.: 16/314,874

(22) PCT Filed: Aug. 30, 2018

(86) PCT No.: PCT/CN2018/103205
§ 371 (c)(1),
(2) Date: Jan. 3, 2019

(87) PCT Pub. No.: WO2019/062458
PCT Pub. Date: Apr. 4, 2019

(30) Foreign Application Priority Data

Sep. 29, 2017 (CN) .......................... 201710906046.3

(51) Int. Cl.
*F16H 13/08* (2006.01)
*G12B 5/00* (2006.01)

(52) U.S. Cl.
CPC ............... *F16H 13/08* (2013.01); *G12B 5/00* (2013.01)

(58) Field of Classification Search
CPC .. F16H 13/08; F16H 25/2252; F16H 25/2266; G12B 5/00; B66F 3/08; B66F 3/18; A47B 37/02; A47B 91/022
USPC ............................ 74/424.93; 475/193, 197
See application file for complete search history.

(56) References Cited

U.S. PATENT DOCUMENTS

| | | | | |
|---|---|---|---|---|
| 3,595,094 A | * | 7/1971 | Lemor ................ | F16H 25/2252 74/89.14 |
| 4,048,867 A | * | 9/1977 | Saari ................... | F16H 25/2252 74/424.92 |
| 4,655,100 A | * | 4/1987 | Frederick ............ | F16H 25/2252 74/424.92 |
| 5,707,414 A | * | 1/1998 | Leidy ....................... | C03B 9/41 65/158 |

* cited by examiner

*Primary Examiner* — Derek D Knight
(74) *Attorney, Agent, or Firm* — Larson & Larson, P.A.; Justin P. Miller; Frank Liebenow

(57) ABSTRACT

The present disclosure relates to a planetary rolling micro-jacking device comprising a bottom plate, a rotating plate and a top plate mounted on a central shaft. There are at least three planetary thread rollers provided between the rotating and the top plates. The rotating and the top plates are provided with multiple annular tooth grooves. The annular tooth grooves of the rotating plate and the annular tooth grooves of the top plate engage with the thread of the planetary thread rollers. The planetary thread rollers roll between the rotating and the top plates, and rotate around the central shaft.

10 Claims, 8 Drawing Sheets

PLANETARY ROLLING MICRO-JACKING DEVICE

CROSS-REFERENCE TO RELATED APPLICATION

This application is a national stage application of International Application No. PCT/CN2018/103205, filed Aug. 30, 2018.

This application claims priority from an earlier patent application submitted on 29 Sep. 2017 in China with Chinese Patent Application Number of No. 201710906046.3. All the contents of that patent application are included into this document by reference.

TECHNICAL FIELD

This disclosed device is a jacking device, specifically a type of planetary rolling micro-jacking device.

BACKGROUND ART

In the fields of industrial production, engineering construction, and scientific research, it is often needed to precisely make minute adjustments to the position of equipment and its components. The demand for applying jacking force over a relatively small range is very common, for instance, in the industrial field, to adjust the level of equipment, clearance, etc.; for bridge construction in the engineering field, to adjust the height of the joint position, clearance, etc.; in daily life, to adjust the legs of furniture and electric appliance. Currently, jacking devices with ordinary threads are most commonly used for micro-adjustments. However, such a jacking device has friction between the threads, making it difficult to adjust with heavy loads, and stick-slip phenomenon can occur during minute adjustments, rendering the fineness of these adjustments unsatisfactory.

SUMMARY OF THE INVENTION

The purpose of this disclosure is to propose a technical solution of a planetary rolling micro-jacking device to improve the performance of heavy-load and precision adjustments of jacking devices.

In order to accomplish the above goal, the technical solution of the present disclosure is a planetary rolling micro-jacking device. The planetary rolling micro-jacking device comprises a bottom plate, a rotating plate and a top plate all mounted on a central shaft. The rotating plate is installed between the bottom and the top plates. At least three planetary thread rollers are placed between the rotating and the top plates. The planetary thread rollers have tapered thread. There are multiple annular tooth grooves on both the top side of the rotating plate and the bottom side of the top plate. The annular tooth grooves of the rotating and the top plates engage with the thread of the planetary thread rollers. The planetary thread rollers roll between the rotating and the top plates, and rotate about the central axis.

Further, in order to operate the planetary thread rollers in a proper manner, a planetary roller cage is placed between the rotating and the top plates. The planetary roller cage rotates around the central shaft as a rotating shaft. The planetary roller cage has planetary roller cage pockets corresponding to the planetary thread rollers. The planetary thread rollers fit into the planetary roller cage pockets.

Further, the planetary roller cage pockets have roller mounting holes, and the planetary thread rollers have roller shafts. The planetary thread rollers are mounted on the planetary roller cage by inserting the roller shafts into the roller mounting holes. The roller shafts of the planetary thread rollers rotate and move axially in the roller mounting holes.

Further, the planetary thread rollers can be coupled to the planetary roller cage pockets by providing the planetary roller cage pockets with roller mounting holes with respect to the inner ends of the planetary thread rollers, and providing the planetary thread rollers with roller shafts at its inner ends.

Further, the planetary thread rollers can also be coupled to the planetary roller cage pockets by providing the planetary roller cage pockets with roller mounting holes with respect to the outer ends of the planetary thread rollers, and providing the planetary thread rollers with roller shafts at its outer ends.

Further, the way the planetary thread rollers are installed is described below. The rotating plate and/or the top plate are provided with outer-ring tooth grooves and inner-ring tooth grooves. The outer ends of the planetary thread rollers are provided with outer-ring gears engaging with the outer-ring tooth grooves. The inner ends of the planetary thread rollers are provided with inner-ring gears engaging with the inner-ring tooth grooves. The planetary thread rollers move along the outer-ring tooth grooves and the inner-ring tooth grooves, and rotate around the central shaft.

Further, the width of the outer-ring tooth grooves is larger than the width of the outer-ring gear of the planetary thread rollers, and the width of the inner-ring tooth grooves is larger than the width of the inner-ring gear of the planetary thread rollers. The outer-ring gear and the inner-ring gear of the planetary thread rollers reciprocate in the direction of the central shaft along the outer-ring tooth grooves and the inner-ring tooth grooves.

Further, a thrust bearing is placed between the bottom and the rotating plates.

Further, in order to enhance the load-carrying capacity, the thrust bearing set between the bottom and the rotating plates is a thrust roller bearing.

The present disclosure has the beneficial effects that: Planetary thread rollers with tapered thread are used. The tapered thread of the planetary thread rollers contact and roll between the rotating and the top plates, and reciprocate in the direction of the axis of the rotating plate to push the top plate to make trace lifts. Rolling friction avoids high friction and the stick-slip phenomenon caused by sliding friction, thereby significantly improving the heavy-load adjustment and precision adjustment performance of the jacking device. In addition, the form of engagement between the rolling element threads and the rotor-disk as well as the stator-disk annular tooth grooves causes the contact area between them to be wave-shaped. The use of multiple planetary thread rollers increases the load-carrying capacity. The device has a self-lock function, and is compact in structure, making it suitable for applications in small spaces.

The present disclosure will be described in detail below with reference to the accompanying drawings and embodiments.

BRIEF DESCRIPTION OF THE DRAWINGS

In order to clearly demonstrate the technical solution of the embodiments associated with this disclosure, brief annotations are provided below for the appended figures of the

3 embodiments. The figures address only a portion of the potential embodiments; it is possible for standard technical staff in the field to produce other relevant figures without creative work.

Figure 1:
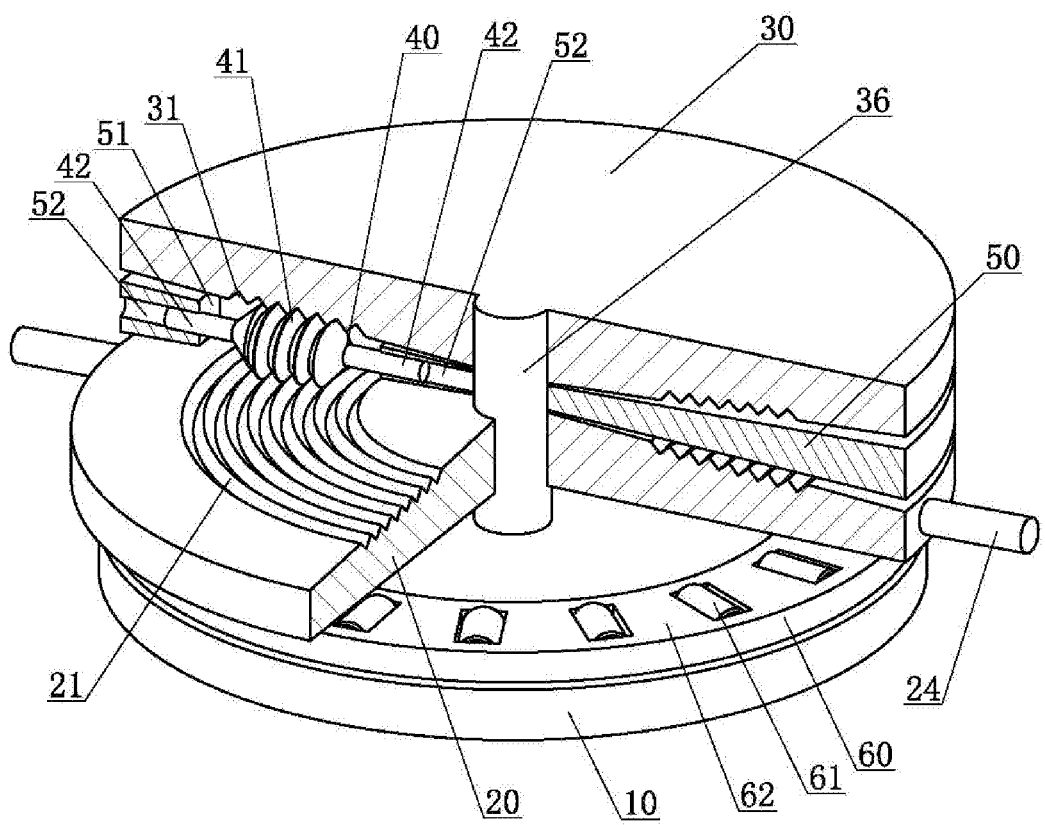

FIG. 1 is a structure drawing of this disclosure, which includes a planetary roller cage.

Figure 2:
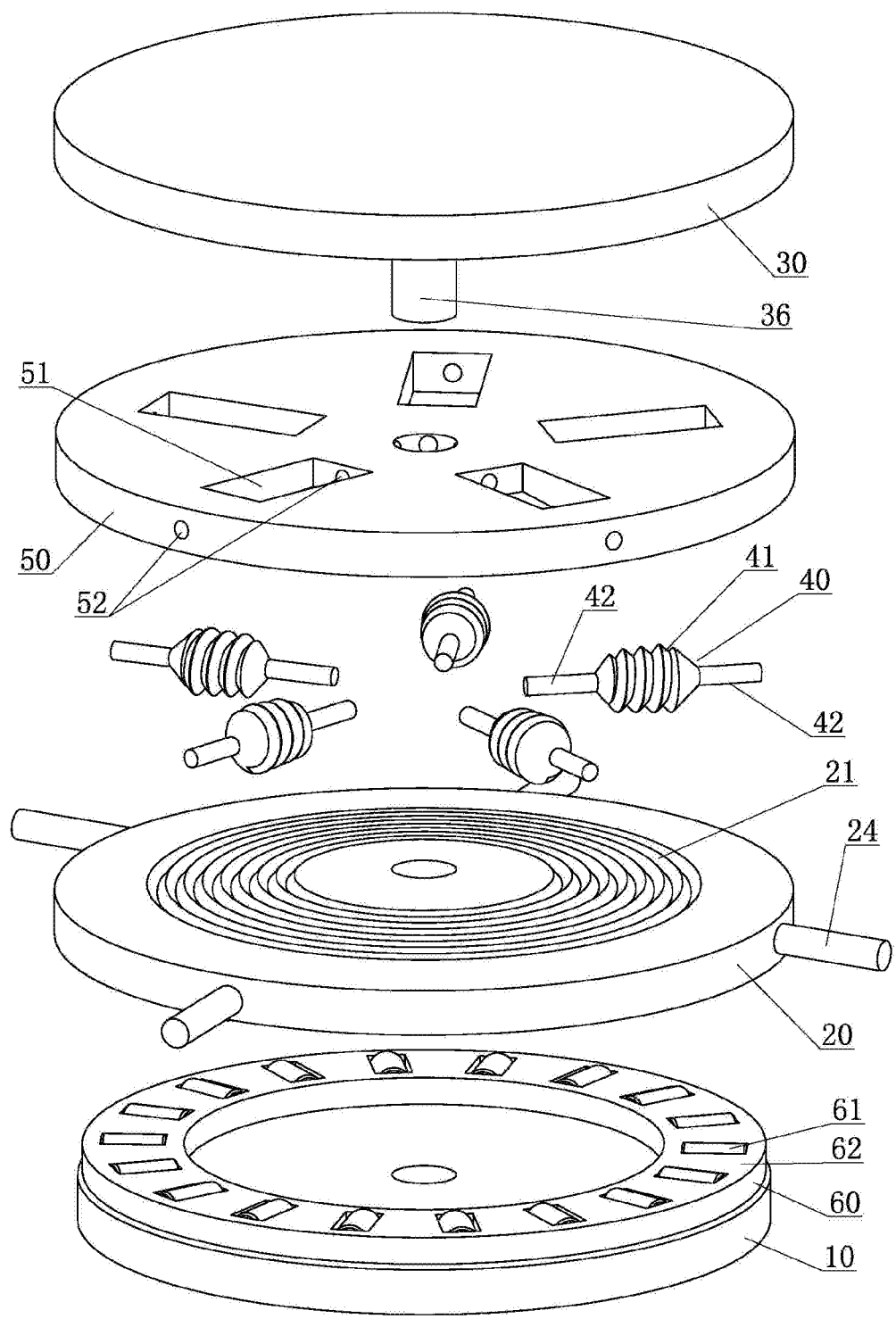

FIG. 2 is a structure breakdown drawing of this disclosure, which includes a planetary roller cage.

Figure 3:
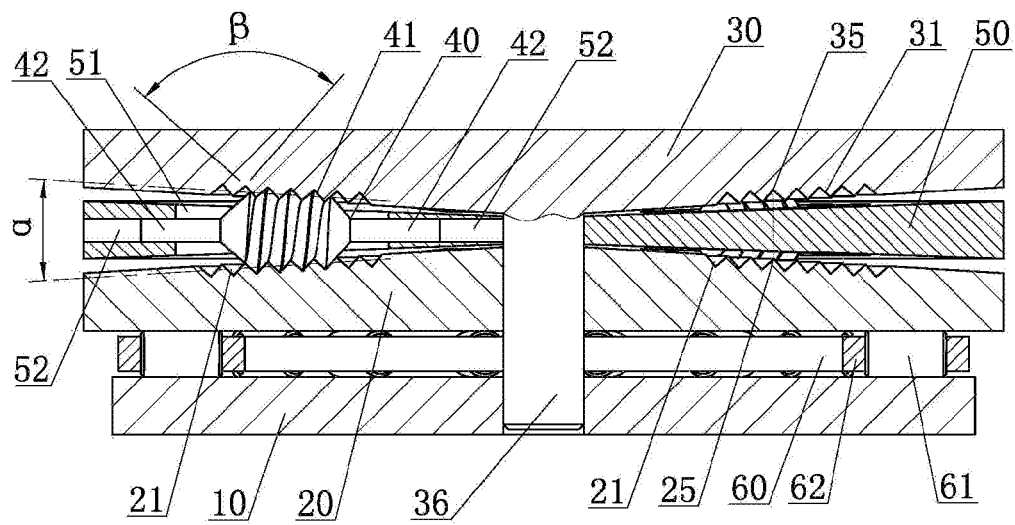

FIG. 3 is a sectional drawing of this disclosure, which includes a planetary roller cage. Engaged with the planetary roller cage, a roller shaft is adopted to both ends of the planetary thread rollers.

Figure 4:
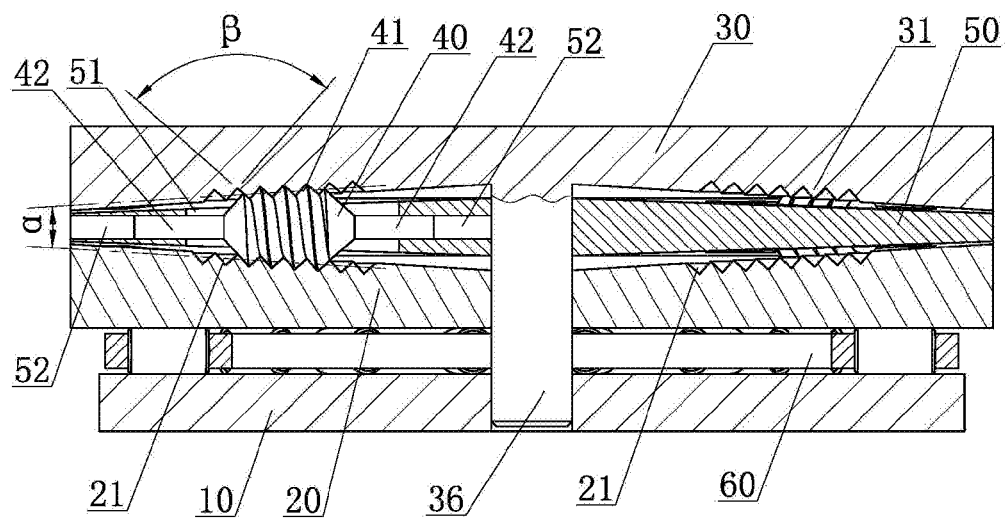

FIG. 4 is a structure drawing of this disclosure, with the major-diameter end of the tapered screw thread pointing towards the central shaft.

Figure 5:
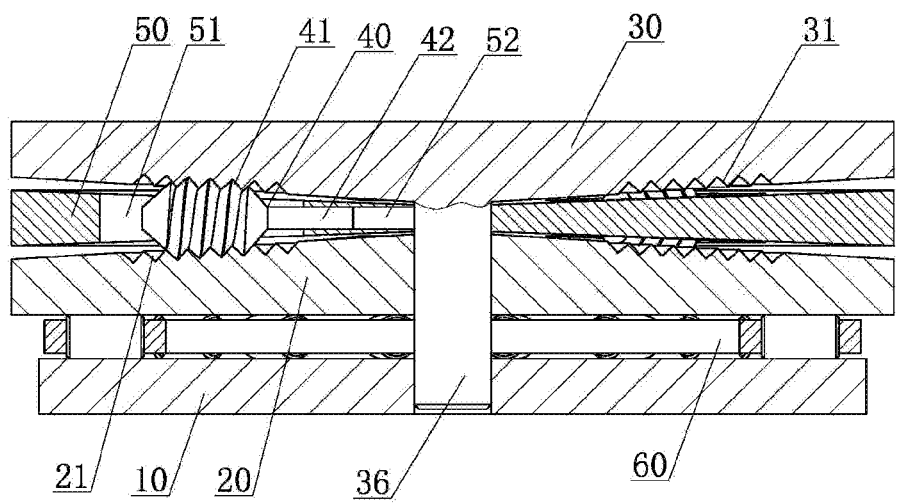

FIG. 5 is a sectional drawing of this disclosure, which includes a planetary roller cage. Engaged with the planetary roller cage, a roller shaft is adopted to the inner end of the planetary thread rollers.

Figure 6:
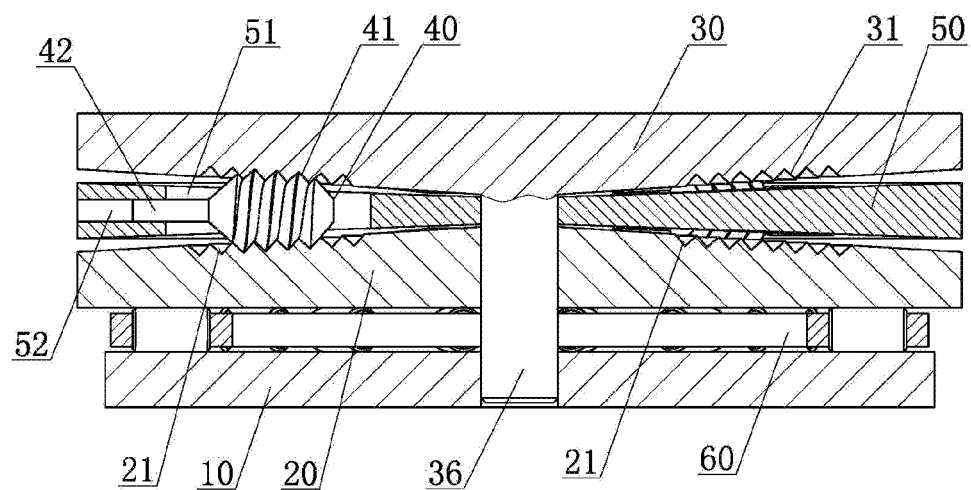

FIG. 6 is a sectional drawing of this disclosure, which includes a planetary roller cage. Engaged with the planetary roller cage, a roller shaft is adopted to the outer end of the planetary thread rollers.

Figure 7:
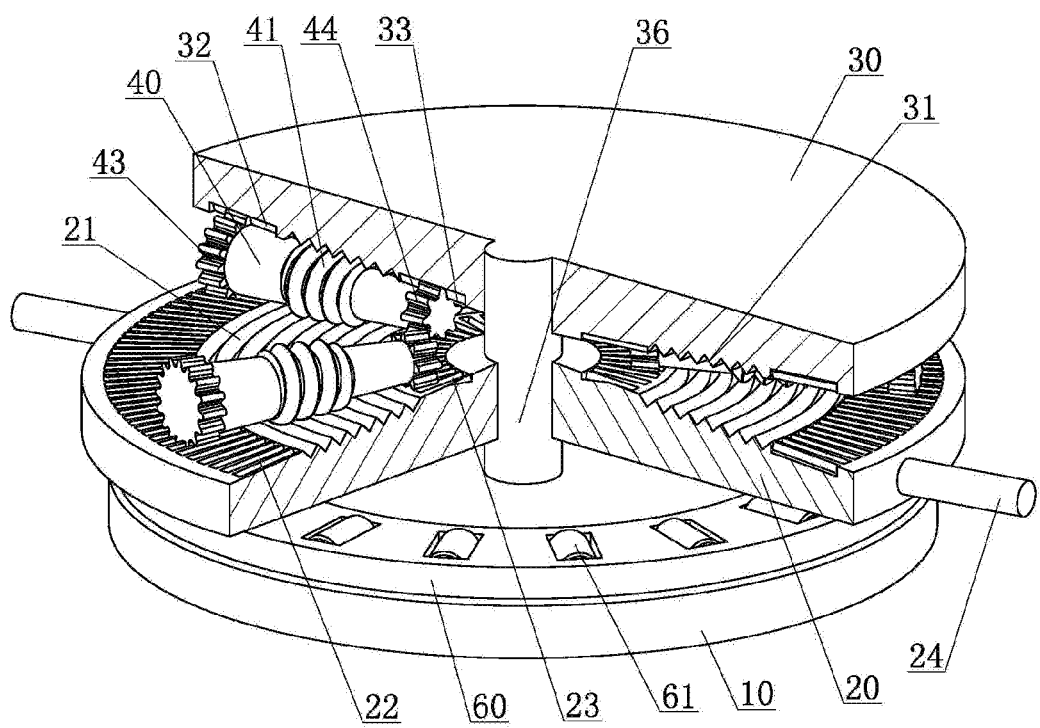

FIG. 7 is a structure drawing of this disclosure. Outer-ring tooth grooves and inner-ring tooth grooves are adopted between the rotating plate and the top plate.

Figure 8:
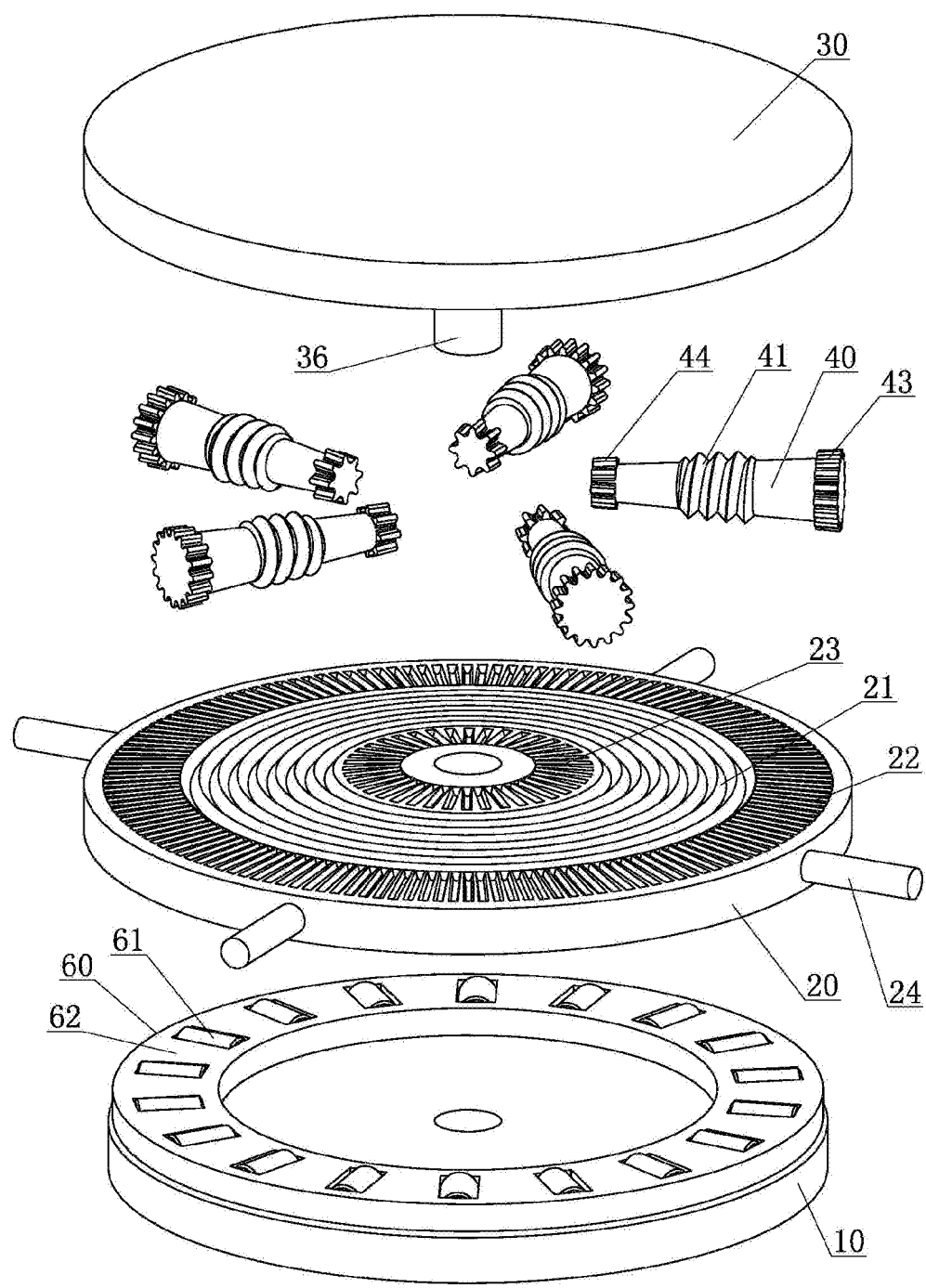

FIG. 8 is a structure breakdown drawing of this disclosure. Outer-ring tooth grooves and inner-ring tooth grooves are adopted between the rotating plate and the top plate.

Figure 9:
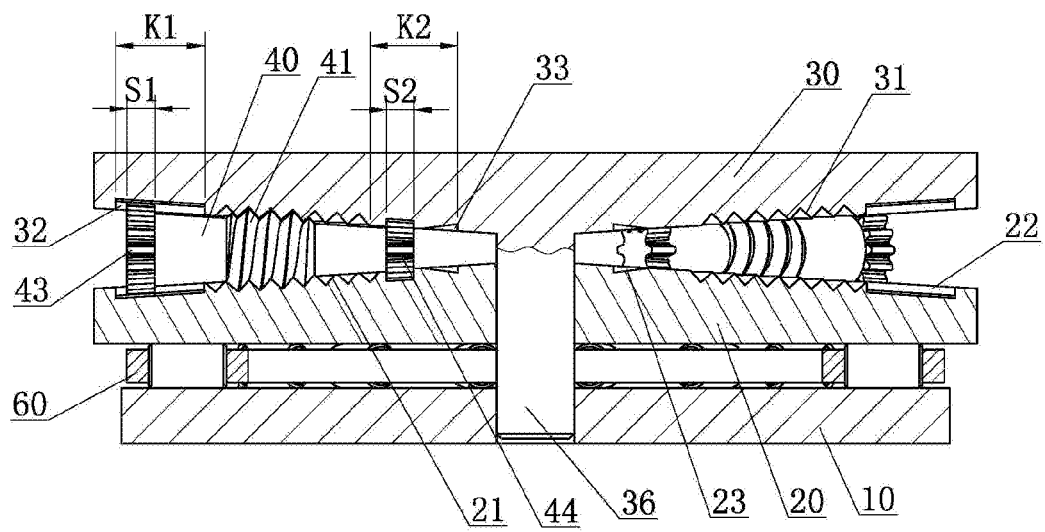

FIG. 9 is a sectional drawing of this disclosure. Outer-ring tooth grooves and inner-ring tooth grooves are adopted between the rotating plate and the top plate.

Figure 10:
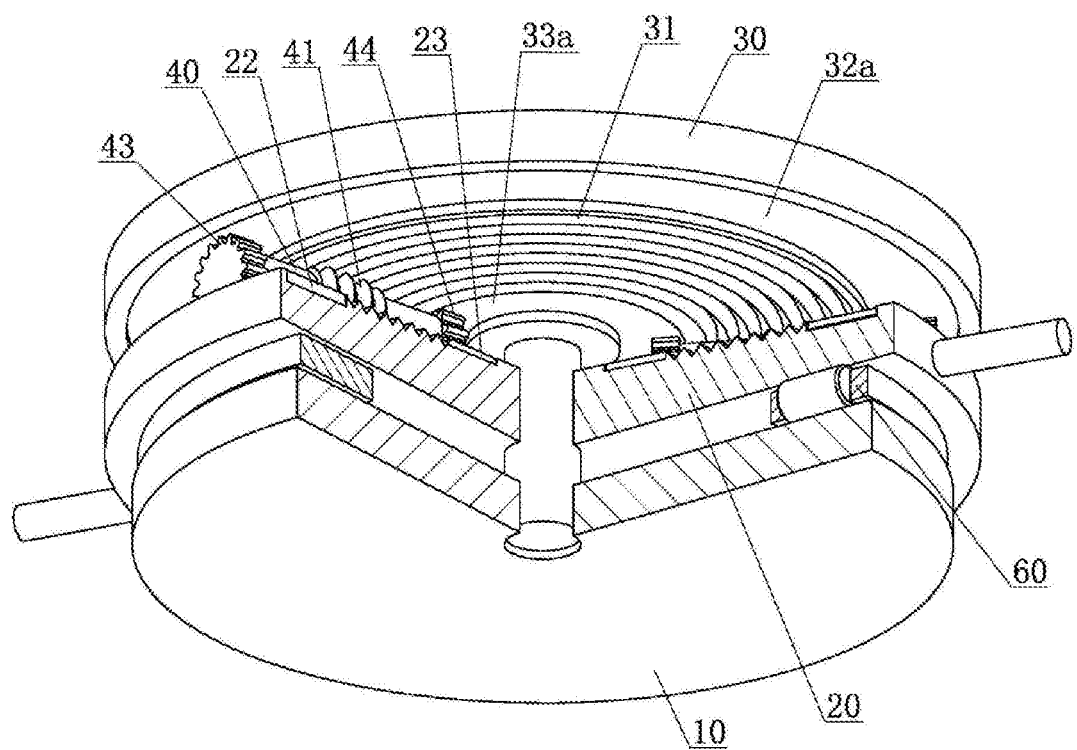

FIG. 10 is a structure drawing of this disclosure. Outer-ring tooth grooves and inner-ring tooth grooves are adopted for the rotating plate.

Figure 11:
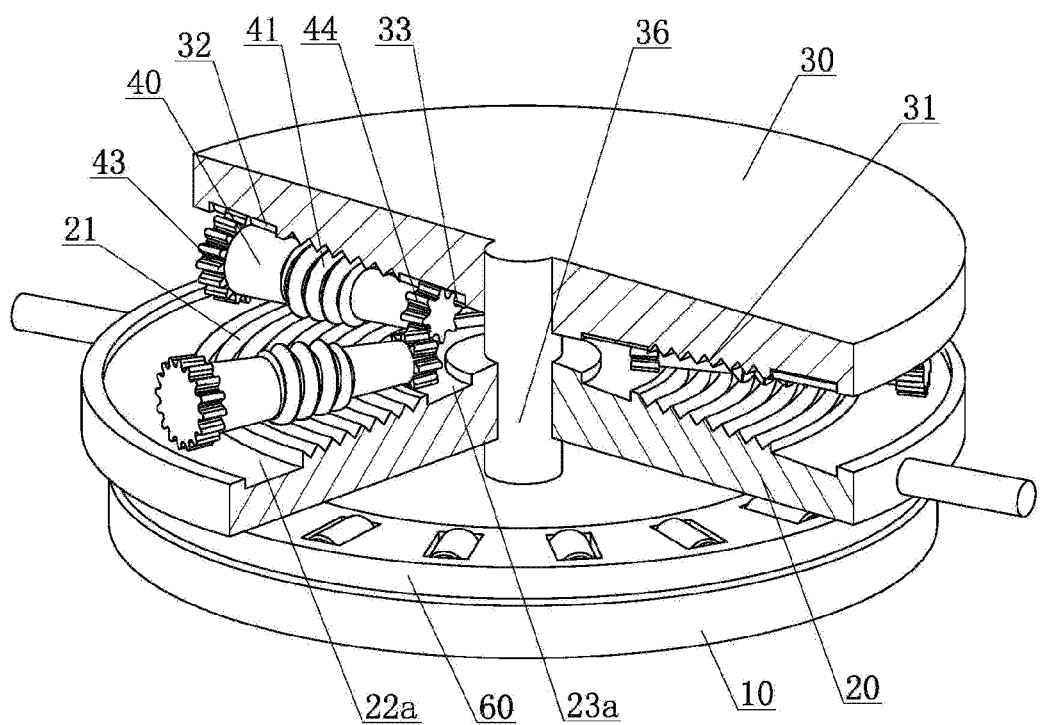

FIG. 11 is a structure drawing of this disclosure. Outer-ring tooth grooves and inner-ring tooth grooves are adopted for the top plate.

DETAILED DESCRIPTION OF THE INVENTION

By referring to the appended figures of the embodiments of this disclosure, we present below a clear and complete description of the technical solution associated with the embodiments. Apparently, the embodiments described are only some examples extracted from the whole set of embodiments. Any other embodiments that may be produced by standard technical staff in the field without creative work are protected by this patent.

FIGS. 1, 2, 3, and 4 show the planetary rolling micro-jacking device. The device consists of a bottom plate 10, a rotating plate 20 and a top plate 30 all assembled to the central shaft 36. The rotating plate sits between the bottom plate and the top plate. There are at least three planetary thread rollers 40 set between the rotating plate and the top plate. The planetary thread rollers have tapered screw thread 41. There are multiple annular tooth grooves 21 made in the top side of the rotating plate, the side that faces the top plate. There are also multiple annular tooth grooves 31 made in the bottom side of the top plate, the side that faces the rotating plate. These tooth grooves in both plates engage with the screw thread on the planetary thread rollers. The rollers roll between the rotating plate and the top plate, and rotate around the central shaft.

The thread tapered angle α of the planetary thread rollers can take on a value ranging from 6°~8°.

The thread pitch angle β of the planetary thread rollers can take on a value ranging from 85°~95°

A planetary roller cage 50 is set between the rotating plate and the top plate, and which rotates around the central shaft. The planetary roller cage is provided with planetary roller cage pockets 51 that engage with the planetary thread rollers, and each planetary thread roller fits in its planetary roller cage pocket.

The cage pocket engaged with each planetary thread roller is provided with a roller mounting hole 52. Each planetary thread roller is provided with a roller shaft 42, through which the planetary thread roller is mounted on the roller mounting hole. The roller shaft of each planetary thread roller is rotated and axially moved in the respective roller mounting hole.

As shown in FIG. 5, each planetary roller cage pocket is provided with a roller mounting hole with respect to the inner end side of the planetary thread roller, and the inner end of the planetary thread roller is provided with a roller shaft.

As shown in FIG. 6, each planetary roller cage pocket is provided with a roller mounting hole with respect to the outer end side of the planetary thread roller, and the outer end of the planetary thread roller is provided with a roller shaft.

As shown in FIGS. 3 and 4, each planetary roller cage pocket is provided with a roller mounting hole at both ends of the planetary thread roller, and a roller shaft is provided at both ends of the planetary thread roller.

As shown in FIGS. 7 to 11, the rotating plate and/or the top plate are provided with outer-ring tooth grooves (22, 32 in the figure) and inner-ring tooth grooves (23, 33 in the figure). Each planetary thread roller is provided with an outer-ring gear 43 on its outer end, which meshes with the outer-ring tooth grooves, and with an inner-ring gear 44 on its inner end, which meshes with the inner-ring tooth grooves. The planetary thread rollers rotate around the central shaft 36 along the outer-ring and inner-ring tooth grooves.

The width K1 of the outer-ring tooth grooves is larger than the width S1 of the outer-ring gears of the planetary thread rollers, and the width K2 of the inner-ring tooth grooves is larger than the width S2 of the inner-ring gears of the planetary thread rollers. The outer-ring gears and the inner-ring gears of the planetary thread rollers reciprocate in the direction of the central shaft along the outer-ring tooth grooves and the inner-ring tooth grooves.

A thrust bearing 60 is disposed between the bottom plate and the rotating plate.

In order to enhance the load carrying capacity, the thrust bearing set between the bottom plate and the rotating plate is a thrust roller bearing.

Embodiment 1

As shown in FIGS. 1, 2, and 3, a planetary rolling micro-jacking device is comprised of a bottom plate 10, a rotating plate 20 and a top plate 30. A central shaft 36 is set through the center of the top plate, and the top plate, the rotating plate and the bottom plate are connected by the central shaft to achieve coaxiality.

The rotating plate is placed between the bottom plate and the top plate. Five planetary thread rollers 40 are provided between the bottom plate and the top plate.

The planetary thread rollers are planetary thread rollers provided with tapered thread 41. In this embodiment, the thread tapered angle of the planetary thread rollers is α=7°;

the thread pitch angle of the planetary thread rollers is β=90°. A roller shaft 42 is provided at both ends of a planetary thread roller. In this embodiment, the minor-diameter end of the tapered thread of the planetary thread rollers points towards the central shaft, and the major-diameter end of the tapered thread of the planetary thread rollers points towards the outer circumference of the rotating plate. The axis of each planetary thread roller orthogonally intersects the axis of the central shaft.

The side of the rotating plate facing the top plate (i.e. the side in contact with the planetary thread rollers) is provided with multiple annular tooth grooves 21. These tooth grooves are non-helical tooth grooves, each of which is a complete circular groove. The tooth profile of the annular tooth grooves corresponds to the thread of the planetary thread rollers. The pitch of two adjacent annular tooth grooves is equal to the pitch of the planetary thread roller thread, and the tooth angle of the annular tooth grooves corresponds to the tooth angle of the planetary thread roller thread (which is 90°). The annular tooth grooves are arranged along the radial direction of the rotating plate to have an inclination that corresponds to the tapered angle of the planetary thread roller thread, which is a half of the tapered angle, i.e. 3.5°. A rotating handlebar 24 is provided on the outer circumference of the rotating plate.

The side of the top plate facing the rotating plate (i.e. the side in contact with the planetary thread rollers) is also provided with multiple annular ring grooves 31, similar to the rotating plate itself. The tooth profile of the annular tooth grooves of the top plate corresponds to the thread of the planetary thread rollers. The pitch of two adjacent annular tooth grooves is equal to the pitch of the planetary thread roller thread, and the tooth angle of the annular tooth grooves corresponds to the tooth angle of the planetary thread roller thread (which is 90°). The annular tooth grooves are arranged along the radial direction of the rotating plate to have an inclination that corresponds to the tapered angle of the planetary thread roller thread, which is a half of the tapered angle, i.e. 3.5°.

The annular tooth grooves of the rotating plate and the annular tooth grooves of the top plate engage with the thread of the planetary thread rollers. For engagement with the planetary thread rollers, the crests 25 of the annular tooth grooves of the rotating plate correspond to the roots 35 of the annular tooth grooves of the top plate.

A planetary roller cage 50 is disposed between the rotating plate and the top plate, coaxial with the central shaft. The planetary roller cage is provided with five planetary roller cage pockets 51 corresponding to the planetary thread rollers, and the planetary roller cage pockets are provided with roller mounting holes 52 corresponding to the roller shafts of the planetary thread rollers. The roller mounting holes are made at both ends of the planetary roller cage pockets relative to the planetary thread rollers. They are through holes that pass through the planetary roller cage pockets in the axial direction and through the planetary roller cage. Every planetary thread roller is mounted in its roller mounting hole in the planetary roller cage through its respective roller shaft. The roller shaft of the planetary thread roller rotates and moves axially in the roller mounting hole.

A thrust bearing 60 is provided between the bottom plate and the rotating plate. In this embodiment, in order to enhance the load carrying capacity, the thrust bearing set between the bottom plate and the rotating plate is a thrust roller bearing. The roller 61 of the thrust roller bearing is disposed in a roller cage 60. For the compactness of the structure, the bottom plate and the rotating plate serve as two bearing rings for the thrust bearing respectively.

The planetary thread rollers rotate about the central shaft in the planetary roller cage.

The planetary rolling micro-jacking device works in such a way that the bottom side of the bottom plate and the top side of the top plate are respectively in contact with two pressed surfaces. The tapered thread of the planetary thread rollers is tightly pressed against the annular tooth grooves of the top plate and those of the rotating plate. When the rotating plate is rotated, the friction between the rotating plate and the planetary thread rollers makes the planetary thread rollers roll between the rotating plate and the top plate, without frictional sliding. The rotation of the planetary thread rollers causes the tapered thread of the planetary thread rollers to rotate along the annular tooth grooves of the rotating plate and those of the top plate, and causes the rollers to be displaced toward the central shaft. The tapered thread of the planetary thread rollers pushes the top plate to move axially. In this process, the absolute rotational displacement along the annular tooth grooves is significantly larger than the vertical displacement of the top plate, so that the planetary rolling micro-jacking device is equipped with very high adjustment precision, a reliable self-locking functionality, and also a higher load carrying capacity.

Embodiment 2

As shown in FIG. 4, a planetary rolling micro-jacking device, this embodiment is a structural replacement of the first embodiment.

In this embodiment, the major-diameter end of the tapered thread of the planetary thread rollers faces the central shaft, the minor-diameter end of the tapered thread of the planetary thread rollers faces the outer circumference of the rotating plate. The axis of each planetary thread roller intersects the axis of the central shaft in an orthogonal way.

Embodiment 3

As shown in FIG. 5, a planetary rolling micro-jacking device, this embodiment is a structural simplification of the first embodiment.

In this embodiment, the inner-end side of the planetary thread rollers 40 is provided with a roller shaft 42.

The planetary roller cage 50 is provided with planetary roller cage pockets 51 corresponding to the planetary thread rollers, and the planetary roller cage pockets are provided with roller mounting holes 52 with respect to the inner-end side of the planetary thread rollers. Corresponding to the roller shaft of the planetary thread rollers, the roller mounting holes are disposed at the inner-end side of the planetary roller cage pockets relative to the planetary thread rollers. They are through holes that axially pass through the inner diameter of the planetary roller cage and through the planetary roller cage pockets.

Every planetary thread roller is mounted in its roller mounting hole in the planetary roller cage through its respective roller shaft. The roller shaft of the planetary thread roller rotates and axially moves in the roller mounting hole.

In this embodiment, the structure of the planetary roller cage is simplified under the condition that the function of the planetary roller cage is realized.

Embodiment 4

As shown in FIG. 6, a planetary rolling micro-jacking device, this embodiment is a structural simplification of the first embodiment.

In this embodiment, the outer-end side of the planetary thread rollers 40 is provided with a roller shaft 42.

The planetary roller cage 50 is provided with planetary roller cage pockets 51 corresponding to the planetary thread rollers, and the planetary roller cage pockets are provided with roller mounting holes 52 with respect to the outer-end side of the planetary thread rollers. Corresponding to the roller shaft of the planetary thread rollers, the roller mounting holes are disposed at the outer-end side of the planetary roller cage pockets relative to the planetary thread rollers. They are through holes that axially pass through the outer diameter of the planetary roller cage and through the planetary roller cage pockets.

Every planetary thread roller is mounted in its roller mounting hole in the planetary roller cage through its respective roller shaft. The roller shaft of the planetary thread roller rotates and axially moves in the roller mounting hole.

In this embodiment, the structure of the planetary roller cage is simplified under the condition that the function of the planetary roller cage is realized.

Embodiment 5

As shown in FIG. 7, FIG. 8, and FIG. 9, this embodiment of the planetary rolling micro-jacking device is a structural replacement of the first embodiment. Another way of mounting planetary thread rollers is used.

The rotating plate is provided with outer-ring tooth grooves 22 and inner-ring tooth grooves 23. The top plate is provided with outer-ring tooth grooves 32 and inner-ring tooth grooves 33. The outer-ring tooth grooves of the rotating plate correspond to the outer-ring tooth grooves of the top plate. The inner-ring tooth grooves of the rotating plate correspond to the inner-ring tooth grooves of the top plate.

The outer end of each planetary thread roller is provided with an outer-ring gear 43 which meshes with the outer-ring tooth grooves of the rotating plate and the outer-ring tooth grooves of the top plate. The inner end of each planetary thread roller is provided with an inner-ring gear 44 which meshes with the inner-ring tooth grooves of the rotating plate and the inner-ring tooth grooves of the top plate. The planetary thread rollers roll along the outer-ring tooth grooves and the inner-ring tooth grooves, and revolve around the central shaft. The axes of the planetary thread rollers remain intersecting with the axis of the central shaft.

The width of the outer-ring tooth grooves K1 (including the outer-ring tooth grooves of the rotating plate and the outer-ring tooth grooves of the top plate) is larger than the width of the outer-ring gears of the planetary thread rollers S1, and the width of the inner-ring tooth grooves K2 (including the inner-ring tooth grooves of the rotating plate and the inner-ring tooth grooves of the top plate) is larger than the width of the inner-ring gears of the planetary thread rollers S2. The outer-ring gears of the planetary thread rollers can roll along the width of the outer-ring tooth grooves (including the outer-ring tooth grooves of the rotating plate and the outer-ring tooth grooves of the top plate). The inner-ring gears of the planetary thread rollers can roll along the width of the inner-ring tooth grooves (including the inner-ring tooth grooves of the rotating plate and the inner-ring tooth grooves of the top plate). The planetary thread roller therefore reciprocates in the direction of the central shaft.

The planetary rolling micro-jacking device of this embodiment removes the planetary roller cage, which simplifies the structure and makes the device structure more compact.

Embodiment 6

A planetary rolling micro-jacking device is shown in FIG. 10. This embodiment is a structural simplification of the fifth embodiment.

The function of the fifth embodiment can also be realized by providing the outer-ring tooth grooves and the inner-ring tooth grooves only on the rotating plate.

In this embodiment, the rotating plate 20 is provided with outer-ring tooth grooves 22 and inner-ring tooth grooves 23. The top plate 30 is provided with outer-ring groove 32a corresponding to the outer-ring tooth grooves of the rotating plate, and inner-ring groove 33a corresponding to the inner-ring tooth grooves of the rotating plate. The outer end of each planetary thread roller is provided with an outer-ring gear 43 meshing with the outer-ring tooth grooves of the rotating plate. The inner end of each planetary thread roller is provided with an inner-ring gear 44 meshing with the inner-ring tooth grooves of the rotating plate. The planetary thread rollers move along the outer-ring tooth grooves and the inner-ring tooth grooves of the rotating plate, and rotate about the central shaft 36.

The planetary rolling micro-jacking device of the present embodiment removes the outer-ring tooth grooves and the inner-ring tooth grooves of the top plate, further simplifying the structure.

Embodiment 7

A planetary rolling micro-jacking device is shown in FIG. 11. This embodiment is a structural simplification of the fifth embodiment.

The function of the fifth embodiment can also be realized by providing the outer-ring tooth grooves and the inner-ring tooth grooves only on the top plate.

In this embodiment, the top plate 30 is provided with outer-ring tooth grooves 32 and inner-ring tooth grooves 33. The rotating plate 20 is provided with outer-ring groove 22a corresponding to the outer-ring tooth grooves of the top plate, and inner-ring groove 23a corresponding to the inner-ring tooth grooves of the top plate. The outer end of each planetary thread roller is provided with an outer-ring gear 43 meshing with the outer-ring tooth grooves of the top plate. The inner end of each planetary thread roller is provided with an inner-ring gear 44 meshing with the inner-ring tooth grooves of the top plate. The planetary thread rollers move along the outer-ring tooth grooves and the inner-ring tooth grooves of the top plate, and rotate about the central shaft 36.

The planetary rolling micro-jacking device of the present embodiment removes the outer-ring tooth grooves and the inner-ring tooth grooves of the rotating plate, further simplifying the structure.

What is claimed is:
1. A planetary rolling micro-jacking device comprising:
a bottom plate;
a rotating plate;
a top plate mounted on a central shaft;
the rotating plate placed between the bottom and the top plates;
a side of the rotating plate, facing toward the top plate, including multiple annular tooth grooves;

a side of the top plate, facing toward the rotating plate, including multiple annular tooth grooves;

at least three planetary thread rollers set between the rotating plate and the top plates;

each planetary thread roller of the at least three planetary thread rollers including a tapered thread;

the multiple annular tooth grooves of the rotating and the top plates engaging with planetary thread rollers;

the planetary thread rollers roll between the rotating plate and the top plates, and rotate around the central shaft.

2. The device of claim 1, further comprising:

a planetary roller cage is between the rotating plate and the top plate;

the planetary roller cage rotates around the central shaft;

the planetary roller cage including with planetary roller cage pockets corresponding to the planetary thread rollers;

the planetary thread rollers placed in the planetary roller cage pockets.

3. The device of claim 2, wherein:

the planetary roller cage pockets are provided with roller mounting holes;

the planetary thread rollers are provided with roller shafts;

the roller shafts of the planetary thread rollers are mounted in the roller mounting holes of the planetary roller cage; and the roller shafts of the planetary thread rollers rotate, and move axially, within the roller mounting holes.

4. The device of claim 3, wherein:

the planetary roller cage pockets are provided with roller mounting holes with respect to the inner ends of the planetary thread rollers; and the planetary thread rollers are provided with roller shafts at their inner ends.

5. The device of claim 3, wherein:

the planetary roller cage pockets are provided with roller mounting holes with respect to the outer ends of the planetary thread rollers;

the planetary thread rollers are provided with roller shafts at their outer ends.

6. The device of claim 3, wherein:

the planetary roller cage pockets are provided with roller mounting holes at each end of the planetary thread rollers;

the planetary thread rollers are provided with roller shafts at both ends.

7. The device of claim 1, wherein:

the rotating plate and the top plate are provided with outer-ring tooth grooves and inner-ring tooth grooves;

the planetary thread rollers are provided with outer-ring gears at outer ends of the planetary thread rollers;

the outer-ring gears engage with the outer-ring tooth grooves;

the planetary thread rollers are provided with inner-ring gears at inner ends of the planetary thread rollers;

the inner-ring gears engage with the inner-ring tooth grooves;

the planetary thread rollers move along the outer-ring tooth grooves and the inner-ring tooth grooves, and rotate around the central shaft.

8. The device of claim 7, wherein:

the width of the outer-ring tooth grooves is larger than the width of the outer-ring gears of the planetary thread rollers;

the width of the inner-ring tooth grooves is larger than the width of the inner-ring gears of the planetary thread rollers;

the outer-ring gears and the inner-ring gears of the planetary thread rollers reciprocate in the direction of the central shaft along the outer-ring tooth grooves and the inner-ring tooth grooves.

9. The device of claim 1, further comprising:

a thrust bearing between the bottom and the rotating plates.

10. The device of claim 1, further comprising:

a thrust roller bearing between the bottom and the rotating plates.

* * * * *